United States Patent [19]

Bell

[11] Patent Number: 4,649,823

[45] Date of Patent: Mar. 17, 1987

[54] MECHANICAL BOND BETWEEN A SOLID ROCKET PROPELLANT COMPOSITION AND A SUBSTRATE AND A METHOD OF EFFECTING SUCH A BOND

[75] Inventor: Frank H. Bell, Logan, Utah

[73] Assignee: Morton Thiokol, Inc., Chicago, Ill.

[21] Appl. No.: 761,131

[22] Filed: Jul. 31, 1985

[51] Int. Cl.⁴ ............................................. C06D 5/06
[52] U.S. Cl. .................................. 102/289; 102/287; 102/291; 264/3.2
[58] Field of Search ............... 264/3 R, 3 B, 3.1, 3.2; 102/287, 289, 290, 291

[56] References Cited

U.S. PATENT DOCUMENTS

| | | | |
|---|---|---|---|
| 3,965,676 | 6/1976 | Schaffling | 102/290 X |
| 4,337,218 | 6/1982 | Byrd et al. | 102/289 X |
| 4,382,409 | 5/1983 | Burns | 102/289 |

Primary Examiner—Peter A. Nelson
Attorney, Agent, or Firm—James C. Simmons; Gerald K. White

[57] ABSTRACT

A mechanical bond between a solid rocket propellant composition and a substrate such as insulation material is provided by a quantity of molded member portions integral with the substrate and protruding from a substrate surface into the cured propellant composition whereby a linerless rocket motor may be provided. A method of effecting such a bond is also disclosed.

25 Claims, 3 Drawing Figures

MECHANICAL BOND BETWEEN A SOLID ROCKET PROPELLANT COMPOSITION AND A SUBSTRATE AND A METHOD OF EFFECTING SUCH A BOND

The present invention relates to solid rocket motors. More particularly, the present invention relates to the bonding of a solid rocket propellant composition to a substrate such as insulation material in a rocket motor case and to a method of effecting such a bond.

Typically, a solid rocket motor is comprised of a case, an insulation material bonded to the case, a liner bonded to the insulation material, and a solid rocket propellant bonded to the liner. In order to avoid problems such as uncontrolled burning during firing, it is necessary that the propellant grain be securely bonded inside the case so that it can withstand the acceleration forces which are encountered without becoming unbonded.

Since it has been found that solid propellant grains will not usually chemically bond well to insulation material commonly used in rocket motors, it has heretofore been considered necessary to provide a liner material between the propellant grain and the insulation material which will chemically bond to both the propellant and insulation. However, there are many reasons why it would be desirable to eliminate liners from rocket motors if the propellant grain could be adequately bonded directly to the insulation material. Firstly, liners add additional weight to rocket motors and take up additional space without adding additional energy to the system. Secondly, liners are difficult to apply. Thirdly, liners are less controllable than insulation material, i.e., they are viscous and therefore tend to run when they are uncured. Fourthly, the usefulness of liners is time limited. If a propellant grain is cast too soon after a liner is installed, the liner is too wet and a good bond does not take place. However, if there is too much of a delay in casting the propellant against the liner, the liner becomes too hard, and again a good bond is not developed.

In an attempt to achieve a linerless rocket motor, the chemical bonding of a double-base solid rocket propellant to modified EPDM rubber has been attempted. In order to better prepare the surface of the insulation for casting against it, the surface has been sanded or buffed. Such a process of roughening the surface is labor intensive and expensive.

U.S. Pat. No. 4,337,218 to Byrd et al discloses a process of embedding a quantity of structural materials in a rocket motor liner to protrude above the surface of the liner to provide a mechanical bond between the liner and propellant grain. This requires a bond line between the structural materials and the liner which may fail. Further, it is a time consuming and labor intensive process to apply these structural materials as disclosed in Byrd et al to the liner in such a fashion that they are oriented correctly.

In situations where a double-base propellant does not form as good of bond as desired with the liner, it has typically been the practice to add a double-base embedment powder to the liner. In accordance with this practice, the grains of powder are randomly placed in the liner so that many of them project into the propellant which is then cast against the liner. During propellant cure, plasticizer migrates from the propellant, an area of high concentration, to the liner and the embedment powder, areas of low concentration, thereby causing the embedment powder to swell. The swelling effects a mechanical interlock with the propellant after the propellant and liner have cured. However, this method is expensive and difficult to control.

It is therefore an object of the present invention to provide a mechanical bond between a propellant grain and insulation material such that a linerless rocket motor may be provided.

It is another object of the present invention to provide such a mechanical bond which is less susceptible to failure.

It is still another object of the present invention to provide such a mechanical bond which is inexpensive, not labor intensive, and yet provides ease of installation thereby maintaining a more consistently high quality in the product.

It is a further object of the present invention to provide such a mechanical bond whereby a grain may first be prepared and cured and thereafter installed in a rocket motor case.

It is yet another object of the present invention to provide such a mechanical bond wherein the disadvantages associated with the prior art are eliminated or reduced.

These and other objects of the invention will become apparent in the following detailed description of the preferred embodiments of the invention taken in connection with the accompanying drawings.

DETAILED DESCRIPTION OF THE PREFERRED EMBODIMENTS

Figure 1:
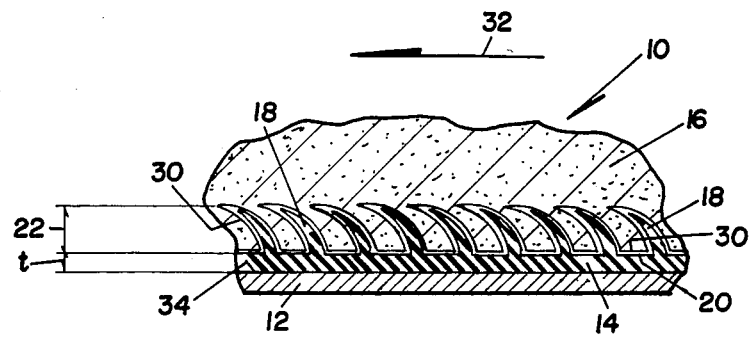
FIG. 1 is a sectional view of a portion of a rocket motor embodying the present invention.

Referring to FIG. 1, there is generally illustrated at 10 a portion of a rocket motor which is provided with a case 12 which may be composed, for example, of a metal such as steel or may be fiber-wound with epoxy impregnated graphite or aramid fibers or the like as may be found conventionally in rocket motors. Bonded to the rocket motor case 12 radially inwardly thereof by any suitable means is an insulation material 14 which may be composed of one or more layers of any suitable material having sufficient thickness to provide adequate insulation between the burning propellant and the case. The insulation material may be composed, for example, of polyethylene, polypropylene, polyisoprene, or polybutadiene which material is filled with an heat resistant material, and is preferably composed of a rubber such as a polymer of EPDM (ethylene propylene diene monomer) rubber which has been filled with heat resistant material such as silica, asbestos, refractory ceramic material, or chopped mineral or synthetic fiber refractory material.

Disposed radially inwardly of the insulation material 14 and bonded thereto by means which will hereinafter be described is a solid propellant grain 16 which has been cast against the insulation material 14. The propellant material 16 may be of any suitable composition, preferably of low viscosity to prevent the formulation of voids during casting, such as, for example, a nitrato ester plasticized propellant or a non-plasticized aluminum/ammonium perchlorate propellant.

The insulation material 14 may have one or several layers and has a generally uniform minimum thickness designated t which is typically between about 0.03 and about 0.12 inches, depending on the composition thereof and the degree of insulation required. If the insulation material is too thin, it may tear easily and not provide sufficient insulation, and if it is too thick, it may be too stiff to form properly and may displace too much propellant. In order to provide a mechanical bond between the insulation material 14 and the solid rocket propellant material 16 cast thereagainst, there is provided preferably uniformly over the insulation material or substrate 14 (or the radially inner layer thereof, if there is more than one layer), in accordance with the present invention, a quantity of member portions 18 which are integral with the substrate 14 and which protrude from the substrate surface 20 which faces radially inwardly to engage the propellant grain 16. By "surface", as that term is used in this specification and the claims, is meant that portion of the surface of a substrate which defines a generally uniform minimum thickness of the substrate, unless indicated otherwise herein. Thus, unless indicated otherwise, the term "surface" is meant to exclude the surfaces of the protrusions 18, that is, surfaces of the insulation material 14 which would define an insulation thickness which is substantially greater than the generally uniform minimum thickness thereof.

Although, in accordance with a preferred embodiment of this invention, the propellant grain is bonded to an insulation material to provide a linerless rocket motor, it may instead be bonded with advantage to a liner.

Figure 2:
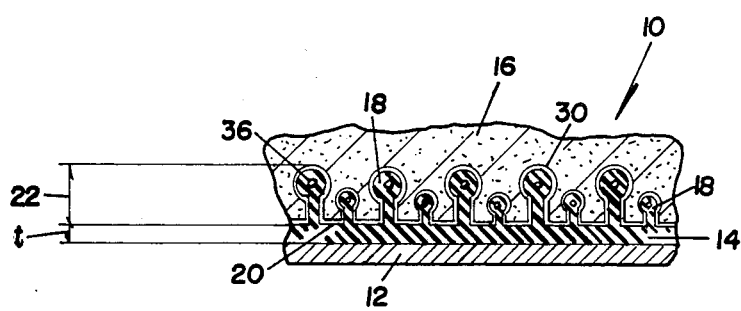
FIG. 2 is a sectional view similar to that of FIG. 1 illustrating an alternative embodiment of the present invention.

It is preferred that the member portions 18 be shaped to provide a maximum peel strength between the propellant grain 16 and substrate 14. For example, hook-shaped member portions, as illustrated in FIG. 1, knob-shaped member portions, i.e., rod-like members protruding from the substrate with bulb-like portions at the ends thereof which protrude into the grain, such as illustrated in FIG. 2, or spiral-shaped members (not shown) should provide a high degree of peel strength. Preferably, the fingers of the hook-shaped member portions 18 shown in FIG. 1 should point in the direction illustrated at 32 toward the rocket nose, since the case 12 drags the grain with it during flight.

In accordance with a preferred embodiment of the present invention, the member portions extend from the substrate surface 20 into the propellant grain a distance illustrated at 22 equal to at least about 0.01 inch in order to provide adequate contact along the member portion surfaces with the propellant grain for adequate bonding strength.

Apertures, such as illustrated at 36 in FIG. 2, may be provided to extend through the member portions 18 to fill with propellant material and thereby interlock the propellant material 16 with the substrate 14 for increased strength of the attachment therebetween.

Although the member portions may be of uniform height 22, as illustrated in FIG. 1, to insure against lay-up problems and to provide a uniform texture to the substrate 14, if the member portions have sequentially varying heights, as illustrated in FIG. 2, the amount of air bubbles in the propellant at the interface with the substrate may perhaps be minimized for better bonding.

Figure 3:
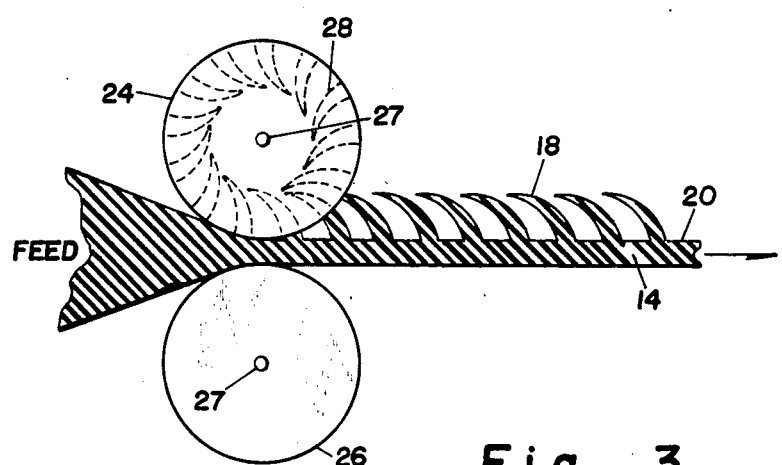
FIG. 3 is a schematic view illustrating the manufacture of insulation material in accordance with the process of the present invention.

FIG. 3 illustrates one method of manufacture of the substrate 14 or insulation material in accordance with the present invention. There is shown a pair of calendar rolls 24 and 26 having rotational axes 27 for molding the substrate illustrated at 14 in FIG. 1 in widths typically of 60 inches. Roller 24 is provided with a pattern illustrated at 28 for providing the member portions 18 protruding from the surface 20 of the substrate 14 as the substrate exits one side of the rollers. The material is fed between the rollers 24 and 26 from the other side of the rollers thereof. Roller 26 does not have such a pattern since the surface thereof which faces the rocket motor case 12 is preferably smooth and does not have such member portions. Another method for molding the substrate may involve applying material against a cured sheet having the pattern for providing the member portions 18. After curing, the cured substrate is then removed from the sheet. However, the present invention is not limited to any particular method of providing a molded substrate.

In order to effect a mechanical bond between the solid rocket motor propellant composition 16 and the substrate 14, the substrate is molded, as illustrated in FIG. 3, such that the surface 20 has a quantity of member portions 18 integral with the substrate 14 and protruding from the substrate surface 20. The substrate 14 is then bonded to the interior surface of rocket motor case with the surface 20 having the member portions 18 protruding therefrom facing radially inwardly. The propellant composition is then cast against the substrate surface 20 and around the protruding member portions 18 according to methods commonly known to those of ordinary skill in the art to which this invention pertains. By this step of casting the solid propellant composition is meant the pouring or flowing of the propellant composition into place and curing it. The processes of extrusion and pultrusion are meant to come with the meaning of "casting". Thus, the protruding member portions 18 are caused to be embedded in the solid propellant composition 16 to form a mechanical bond between the solid propellant composition 16 and the substrate 14.

In accordance with an alternative embodiment of the method of the present invention, the substrate 14 may be formed into a generally cylindrical form with the surface 20 facing inwardly and the solid propellant composition cast against the surface 20 to form a grain while the substrate is outside the case 12. Thereafter, the grain may be inserted in the case 12 and the substrate 14 attached to the case 12 either directly or to insulation which has been attached to the case.

In order to further enhance the bonding strength of the propellant material 16 to the substrate 14 in accordance with a preferred embodiment of this invention, an adhesive coating of material, illustrated at 30, preferably a wash coat of either diisocyanate or triisocyanate, is applied to the substrate surface 20 including the surfaces of the member portions 18.

It is to be understood that the invention is by no means limited to the specific embodiments which have been illustrated and described herein, and that various modifications thereof may indeed be made which come within the scope of the present invention as defined by the appended claims.

What is claimed is:

1. A method of effecting a mechanical bond between a solid propellant composition of a rocket motor and a substrate which is disposed between the rocket motor case and the propellant composition, the method comprises the steps of:

a. molding a substrate such that a surface thereof has a quantity of member portions integral with the substrate and protruding from the substrate surface; and b. casting a solid propellant composition against said substrate surface and around the protruding member portions to form a grain for the rocket motor whereby the protruding member portions are embedded in the solid propellant composition to form a mechanical bond between the solid propellant composition and the substrate.

2. A method according to claim 1 further comprises thereafter inserting the cast solid propellant composition in the case and bonding the substrate thereto.

3. A method according to claim 2 wherein the substrate is an insulation material.

4. A method according to claim 3 further comprises applying an adhesive material to the surfaces of the insulation material and protruding member portions to chemically bond the insulation material to the solid propellant composition.

5. A method according to claim 1 further comprises the step, prior to casting the solid propellant composition, of bonding the substrate to the rocket motor case with said surface having the member portions protruding therefrom facing radially inwardly.

6. A method according to claim 5 wherein the substrate is an insulation material.

7. A method according to claim 6 further comprises applying an adhesive material to the radially inner surfaces of the insulation material and protruding member portions to chemically bond the insulation material to the solid propellant composition.

8. A method according to claim 1 wherein the substrate is an insulation material.

9. A method according to claim 8 further comprises applying an adhesive material to the surfaces of the insulation material and protruding member portions to chemically bond the insulation material to the solid propellant composition.

10. A method according to claim 9 includes selecting as the adhesive material a wash coat of one of diisocyanate and triisocyanate.

11. A method according to claim 1 further comprises shaping the member portions so that they have the shapes of hooks.

12. A method according to claim 5 further comprises shaping the member portions so that they are knob-shaped at their ends which protrude into the solid propellant composition.

13. A method according to claim 1 wherein the substrate is EPDM rubber which contains a heat resistant material.

14. A method according to claim 1 further comprises sizing the member portions to have sequentially varying heights.

15. A method according to claim 1 further comprises sizing the member portions so that they protrude from the substrate surface into the solid propellant composition a distance of at least about 0.01 inch.

16. A method according to claim 1 further comprises providing apertures in the member portions and filling the apertures with the propellant material to effect interlocking between the solid propellant composition and the substrate.

17. In a rocket motor including a rocket motor case, a cured solid propellant composition, and a substrate which is disposed between the case and the solid propellant composition and which has a surface which engages said composition, means including a quantity of member portions integral with said substrate and molded therein protruding into the solid propellant composition from said substrate surface for forming a mechanical bond between said substrate and said solid propellant composition.

18. In a rocket motor according to claim 17 wherein said substrate is an insulation material.

19. In a rocket motor according to claim 18 wherein said insulation material is EPDM rubber which contains a heat resistant material, and a wash coat of one of diisocyanate and triisocyanate is applied between the insulation material and solid propellant composition to effect chemical bonding thereof.

20. In a rocket motor according to claim 17 wherein said member portions have the shapes of hooks.

21. In a rocket motor according to claim 17 wherein said member portions are knob-shaped at their ends which protrude into the solid propellant composition.

22. In a rocket motor according to claim 17 wherein said member portions have sequentially varying heights.

23. In a rocket motor according to claim 17 wherein the member portions protrude from said substrate surface into said solid propellant composition a distance of at least about 0.01 inch.

24. In a rocket motor according to claim 17 wherein said mechanical bond forming means includes means defining an aperture which extends through at least one of said member portions and which is filled with solid propellant composition.

25. In a rocket motor according to claim 17 wherein said substrate is EPDM rubber which contains a heat resistant material.

* * * * *